March 18, 1969
O. A. HEDQUIST
3,433,920
APPARATUS FOR SECURING PIGTAILS TO FOIL WRAPPED
CONDENSERS OR THE LIKE
Filed Aug. 30, 1965
Sheet 1 of 3
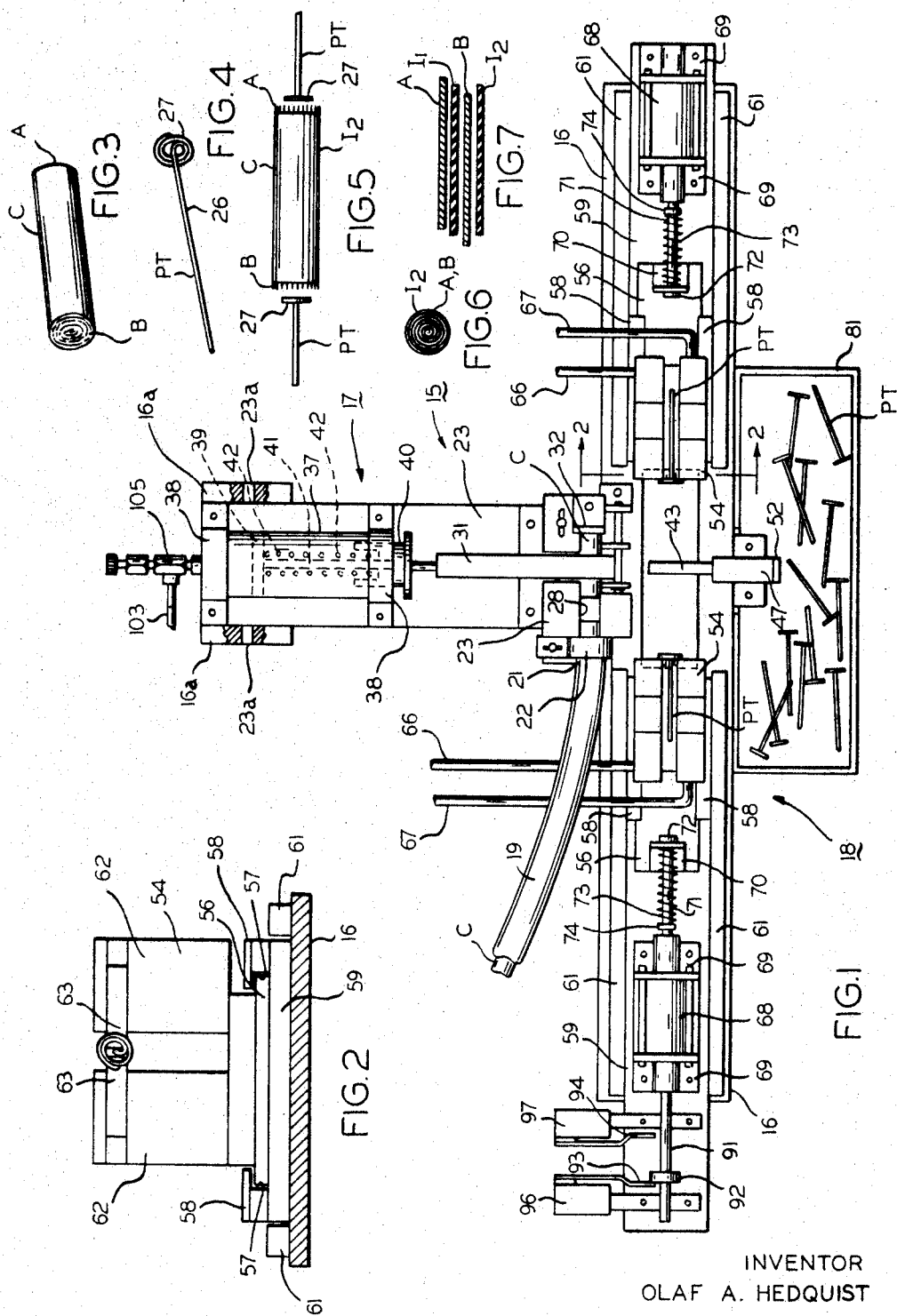
INVENTOR
OLAF A. HEDQUIST
BY
ATTORNEY

INVENTOR
OLAF A. HEDQUIST
BY
ATTORNEY

United States Patent Office 3,433,920
Patented Mar. 18, 1969

3,433,920
APPARATUS FOR SECURING PIGTAILS TO FOIL
WRAPPED CONDENSERS OR THE LIKE
Olaf A. Hedquist, 17 W. 211 Leahy Road,
Villa Park, Ill. 60181
Filed Aug. 30, 1965, Ser. No. 483,626
U.S. Cl. 219—79                5 Claims
Int. Cl. B23k 11/02, 9/12; H01g 13/00

ABSTRACT OF THE DISCLOSURE

Apparatus for attaching pigtails to foil wrapped capacitors moved in end-to-end relationship to a feed shuttle moving the first of the capacitors to a welding station, and including a pair of pigtail holding jaws for moving a pigtail against a corresponding end of the capacitor, with spring biased and lost motion means for maintaining the welding pressure of the pigtail against the capacitor substantially uniform.

---

The structure according to the present invention finds particular application for securing pigtails to the ends of wound capacitors made of aluminum foil. It is particularly difficult to solder or weld to this kind of foil as oxide forms thereon immediately by reason of the chemical activity of the metal. The oxide is extremely difficult to solder or weld, and ordinarily it can be soldered only with oxygen absorbing and excluding fluxes, or welded in a special gas milieu. Present practice in the case of wound aluminum foil capacitors includes the steps of wiping the protruding foil ends in molten aluminum solder, cooling the soldered ends, heating a pigtail in a hand soldering iron, and applying the heated pigtail to the previously solder coated end of the wound foil capacitor.

The structure according to the present invention makes it possible to feed a wound aluminum foil capacitor to a welding station, move a pair of current heated pigtail supports against the ends of the capacitor with the pigtails carried by such supports, and to confine the heating energy precisely at the ends of the capacitor where the foil protrudes. The time of energization is extremely small, but the quantity of energy is extremely high, as compared to conventional techniques. The localizing of the heating effect at each end of the capacitor and at the pigtail supporting devices enables the foil readily to be welded to the pigtail, all without any necessity for providing special fluxes or special gas environments.

With the foregoing considerations in mind it is a principal object of the invention to provide structure for applying wire connections, commonly called pigtails, to the ends of a wound foil condenser or the like.

Another object is to provide a structure for welding pigtails to the ends of a wound foil capacitor, said structure being characterized by structure for feeding the wound capacitors in end to end fashion to a station for transfer one at a time to a welding station having a pair of movable heat energy supplying pigtail supporting devices each capable of translative movement into contact with the ends of the wound foil capacitor.

Still another object is to provide a pair of movable jaws, each supporting a pigtail adapted to be welded to a wound foil capacitor, each of the jaws being so constructed and arranged as to confine substantially all of the heat energy to the pigtail, so that the energy can in turn be transferred to the protruding ends of the spirally wound foil.

A yet further object is to provide structure of the general class contemplated in which prewound capacitor bodies are fed in end to end fashion to a feeding station in turn adapted to move an individual capacitor body to a welding station having heat energy devices for supporting the pigtails and transferring the heat to same, so that the pigtails can transfer readily a large quantity of heat to the foil body, each of the supporting devices being arranged to press the pigtail against the foil body with a desired welding pressure only.

In the specification herein the expression "welding" is intended to embrace the processes denoted as brazing or soldering, depending on the type of foil material and the type of pigtails to be connected to the ends of the foil body.

Other objects and important features of the invention will be apparent from a study of the specification following taken with the drawings which together describe and illustrate a preferred embodiment of the invention and what is now considered to be the best mode of practising the principles thereof. Other embodiments may be suggested to those having the benefit of the teachings herein, and such other embodiments are intended to be reserved especially as the fall within the scope of the subjoined claims.

In the drawings:

FIG. 1 is a plan view of the apparatus according to the present invention;

FIG. 2 is an end view of one of the supports for a pigtail showing details of structure for transferring heat energy thereto;

FIG. 3 is a perspective view of a capacitor formed from wound foil and adapted to have a pigtail welded thereto by the structure seen in FIG. 1;

FIG. 4 is a perspective view of a pigtail adapted to be welded to the capacitor seen in FIG. 3;

FIG. 5 is a plan view showing a capacitor and the manner in which the pigtails are brought against the same for welding;

FIG. 6 is an end view of the capacitor seen in FIG. 5;

FIG. 7 is a section showing how the layers making up the capacitor are disposed for the winding operation;

Figure 8:
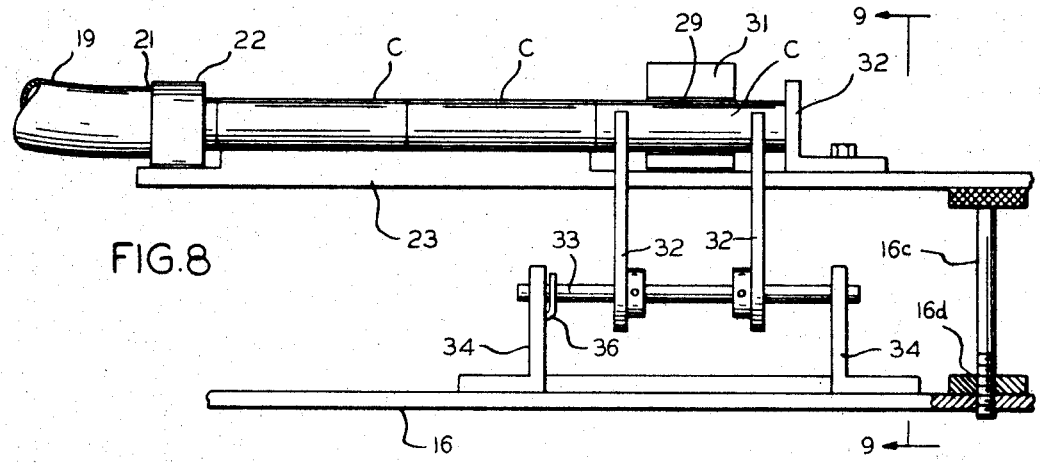
FIG. 8 is a front elevation view of mechanism for feeding the capacitor to the station where the pigtails are welded to the ends thereof.

Referring now particularly to FIG. 1 of the drawings, the apparatus for securing pigtails to foil wrapped condensers is referred generally by the reference numeral 15, and comprises a base 16 supporting a feed station indicated generally by reference numeral 17 and a welding station indicated generally by the reference numeral 18. Feed station 17 is adapted to receive a wound foil capacitor C by means of feed tube 19 having its delivery end 21 held by a clamping ring 22 to a stage 23 spaced above the base 16, see FIGS. 8 and 9.

The feed station 17 is adapted to feed a single capacitor C to the welding station 18 the welding at each end thereof a pigtail PT. The details of the capacitor C and the pigtails PT to be welded thereto at each end are best seen with reference to FIGS. 3 to 7 inclusive. As seen in these figures the capacitor is in the form of a wound cylinder comprised of wound foil elements A and B. Insulation $I_1$ separates foil elements A and B and insulation $I_2$ underlies foil element B. The elements described are laid up in sandwich style, but it should be noted that foil elements A and B are offset with respect to each other, so that when the sandwich is wound (a winding form, not shown, may be used when indicated) with foil element A innermost; foil elements A and B protrude as spiral elements from the ends of capacitor C, insulation $I_2$ being outermost as a wrapper.

In FIG. 4 the pigtail PT is shown as consisting of a wire shank 26 having an end thereof wound as a spiral 27, the plane of spiral 27 being normal to the axis of the shank 26. The pigtails PT are adapted to be welded to each end of the capacitor C as seen in FIG. 5, with the spirals 27 in firm contact with the protruding ends A and B of capacitor C while the welding operation takes place.

Figure 9:
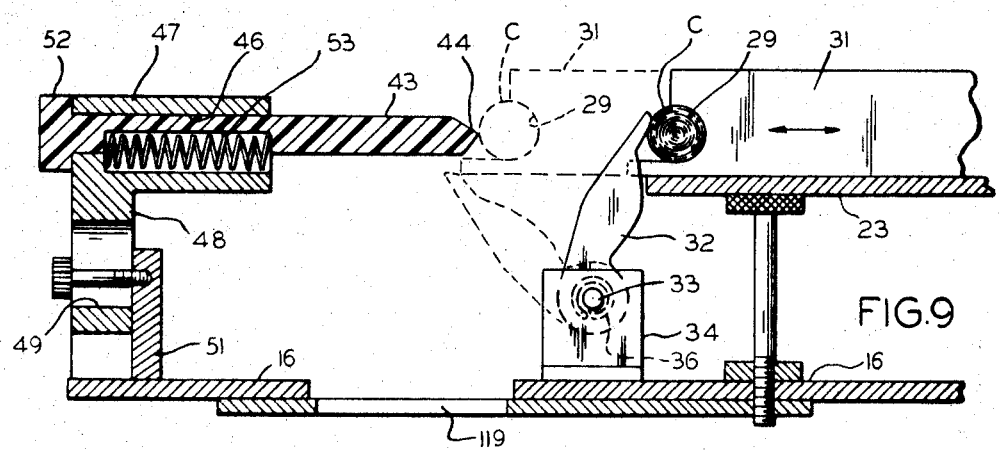
FIG. 9 is a side view thereof looking in the direction of the arrows 9—9 of FIG. 8.
Figure 10:
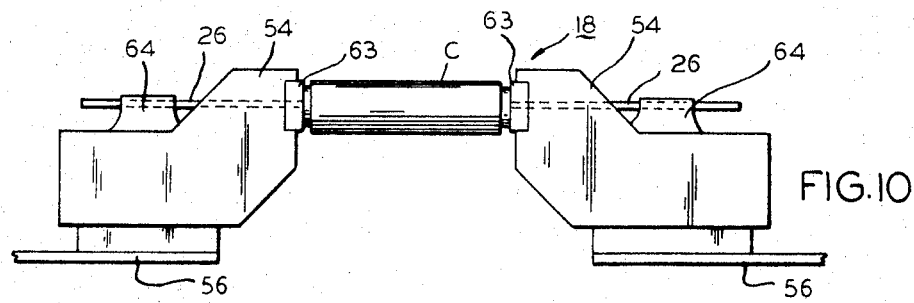
FIG. 10 is an elevational view of the welding station showing the capacitor in position thereat for the welding operation.
Figure 11:
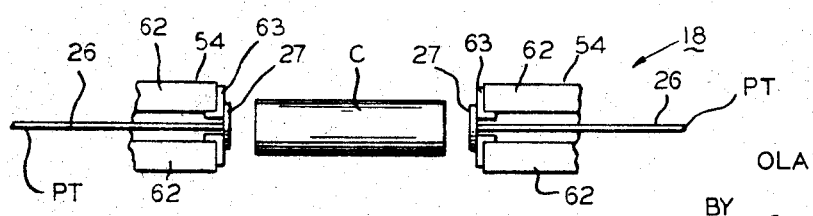
FIG. 11 is a plan view thereof.
Figure 12:
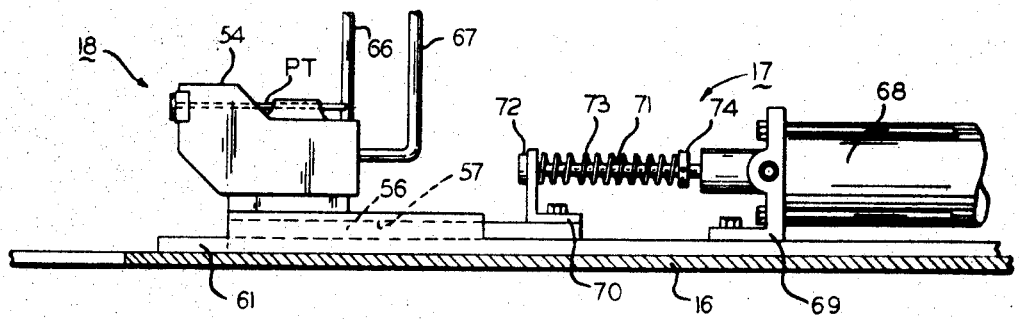
FIG. 12 is an elevational view showing mechanism for advancing the pigtail supporting and heating devices to a position for welding the pigtails to the capacitor.

Referring now to FIGS. 1, 8 and 9, the capacitors C are fed by the tube 19 in end to end relationship across the stage 23 which has a pair of adjustably spaced guides 28 thereon. The spacing of guides 28 is varied according to the diameter of the capacitor C being acted upon by the machine according to the invention. The details of the structure for feeding the capacitors C form no part of the present invention, and any commercial form of same may be employed such as a vibratory type of feeder which consists of a vibrating hopper adapted to move the capacitors C in end to end fashion up a helical ramp ultimately to leave the vibrator and enter the feed tube 19. The feed tube 19 is interchangeable according to the diameter of the capacitors being fed therein.

The first of such capacitors emerging from feed tube 19 moves across a feedjaw 29 of a feed shuttle 31 supported on the stage 23, and against a stop 32 secured by cap screw 33 to the top of stage 23. The diameter of jaw 29 and the size of shuttle 31 is varied according to the diameter of capacitor C. A pair of stripper fingers 32 flank the capacitor C and hold the same in the feed jaw 29. Stripper fingers 32 are fast on a rock shaft 33 supported on its ends in standards 34 secured to the base 16, and the fingers 32 are biased in a clockwise direction as seen in FIG. 9 against the capacitor C by torsion springs 36 constrained between rock shaft 33 and standards 34.

Structure is provided for moving the capacitor C to the welding station 18 seen in FIG. 1 particularly, and comprises a feed cylinder 37 supported on stage 23 and held thereto by clamping bands 38. Feed cylinder 37 has a piston 39 and piston rod 41 therein, piston rod 41 being secured in any convenient fashion to the feed shuttle 31.

A spring 42 is constrained between piston 39 and an adjustable closure 40 for the end of cylinder 37. Closure 40 forms a guide for piston rod 41. Piston 39 is adapted to engage with closure 40 at the end of its stroke, and closure 40 has adjustable threaded engagement with cylinder 37 to determine the length of the stroke of piston rod 41 and feed shuttle 31 attached thereto. The adjustment of the stroke of shuttle 31 is necessary according to the diameter of the capacitor C.

Structure is provided for adjusting the position in a vertical plane of the stage 23 and the shuttle 31 movable thereacross in accordance with the diameter of the capacitor C. To this end the stage 23 is pivoted with respect to the base 16. Stage 23 has a pair of gimbal pans 23a, see FIG. 1, extending therefrom and engageable in support standards 16a extending upward from base 16. Stage 23 is pivoted on the gimbal pins 23a, and the position of stage 23 with respect to base 16 is adjusted by a knurled screw 16c, see FIGS. 8 and 9 tapped into base 16. A lock nut 16d threaded to screw 16c locks the same in position.

As seen in FIG. 9 capacitor C moves to the welding station 18 against a spring biased stop finger 43 having a slightly pointed end 44. Stop finger 43 slides in a bore 46 formed in sleeve 47 extending along the axis of feed shuttle 31. Sleeve 47 has a lateral extension 48 therefrom adjusted in its position by a slot 49 and securing screw tapped into a vertical support 51 extending from base 16. Sleeve 47 and stop finger are adjusted in their vertical position according to the diameter of capacitor C. Stop finger 43 has a head 52 engaging the sleeve 47, and a spring 53 biases finger 43 to the right as seen in FIG. 9, it yielding against the bias of spring 53 when the capacitor C is moved to the welding station 18.

The stripper fingers 32 holds the capacitor C in the jaw 29 of shuttle 31, and as the latter moves to the welding station 18 the fingers 32 rock to the dotted line position seen, at which time capacitor C is held in jaw 29 by finger 43. As will be shown, at the conclusion of the welding operation the capacitor C is supported at the welding station, although the feed shuttle 31 has returned to the position to receive another capacitor for a repeated operation thereon.

The welding station comprises a pair of slide mounted heat transfer jaws 54. Each of the jaws 54 is secured to a slide 56 guided in spaced slots 57 formed in laterally spaced guide members 58 upstanding from a support plate 59 guided between laterally spaced guides 61 secured to the base 16, see also FIG. 2.

Each of the heat transfer jaws 54 has spaced jaw elements 62 adapted to support therebetween a stirrup member 63 adapted to support the shank 26 of pigtail PT. Shank 26 is also adapted to be supported additionally throughout its length on small saddles 64 supported on the heat transfer jaws 54.

Each of the heat transfer jaws 54 is adapted to enclose a rapid heating resistance element (not shown) arranged to conduct its heat to the stirrup 63 and localize its heat thereat to create great intensity thereof at pigtail PT. The heat transfer jaws 54 have leads 66 and 67 thereto to supply the resistance elements held therein.

Structure is provided for moving the jaw members 54 toward each other when each is holding a pigtail PT, so that the capacitor C is engaged between the pigtails PT. Such structure imposes a limited amount of endwise pressure against the capacitor while the same is held in position as seen in FIG. 9.

To this end, and as seen particularly in FIG. 1, the support plate 59 has mounted thereon a double acting cylinder 68. Support brackets 69 hold cylinder 68 to the support plate 59. Cylinder 68 has a piston rod 71, and has a lost motion spring connection to the slide 56 supporting the jaw 54 through the medium of a bracket 70 secured to slide 56, and having piston rod 71 passing therethrough. The lost motion connection includes a keeper nut 72 threaded to the end of the piston rod passing through bracket 70 and a coil spring 73 supported on piston rod 71, and constrained between the bracket 70 and a stop collar 74 secured to piston rod 71.

The cylinder 68 is adapted to urge its associated jaw 54 together with pigtail PT against capacitor C. The amount of such pressure is limited to that produced by the spring 73 of the lost motion connection just described. It may be noted that the initial position of cylinder 68 and support plate 59 with respect to base 16 is determined first, and any suitable structure, not shown, may be employed to lock plate 59 and base 16 together.

Figure 13:
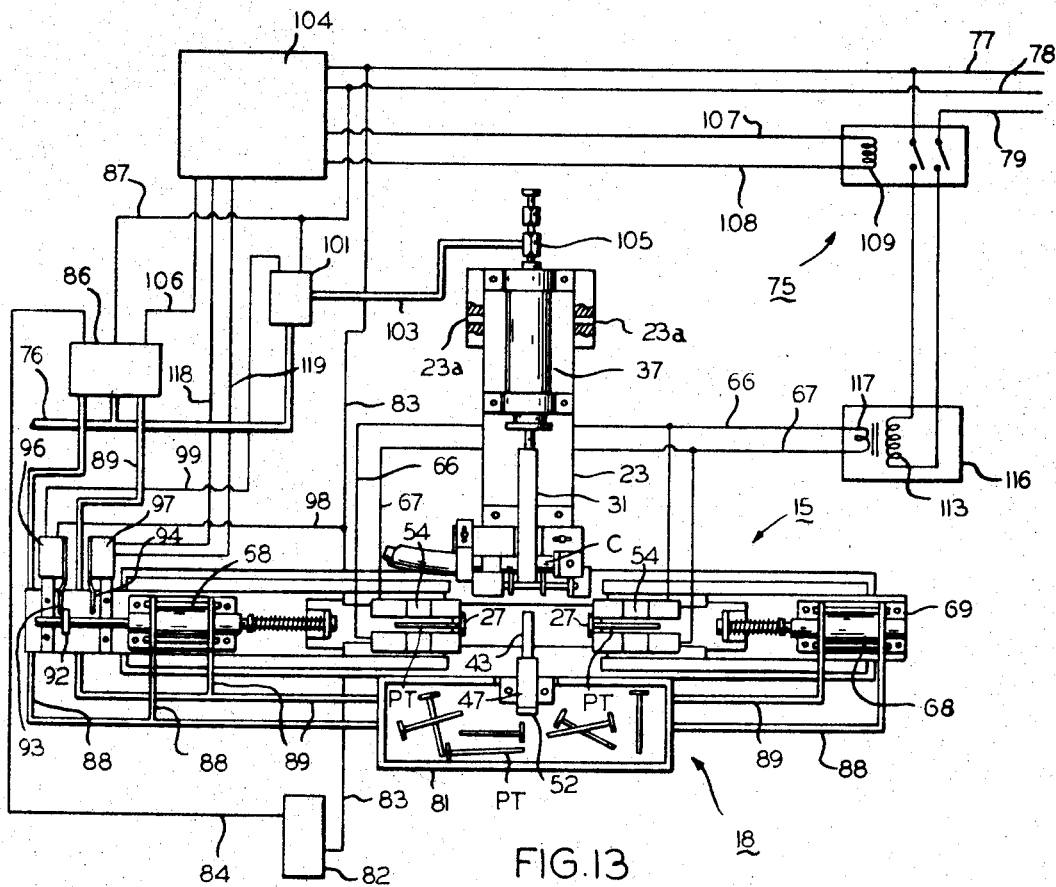
FIG. 13 is a view similar to FIG. 1 showing control circuitry for the apparatus of FIG. 1 superimposed thereon.

Structure is provided for determining the sequence of operations at feed station 17 and at welding station 18, and in FIG. 13 there is shown control circuitry indicated by the reference numeral 75. Power for energizing the cylinders 37 and 68 is provided by a pressure line 76 connected to a suitable pressure air source, not shown. Control devices for the cylinders 37 and 68 are supplied with power from a three wire single phase source comprising power leads 77, 78 and 79.

Consider now the sequence of operations obtaining to weld the pigtails PT to the ends of a capacitor. Prior to the initiation of the welding cycle pigtails PT are removed by the operator from a tray 81 containing the same and located in front of the base 16. A pigtail is placed in each jaw 54 and a welding cycle initiated as follows.

Closing of a foot actuated switch 82 causes a circuit to be closed consisting of power lead 77, a lead 83 branching therefrom and connected to switch 82, a lead 84 therefrom connected to a four-way solenoid operated valve 86, the circuit being completed through valve 86 by a lead 87 connected to power lead 78.

It may be noted that 110 v. A.C. may be afforded across leads 77 and 78 for control purposes, while 220 v. A.C. may be provided across leads 77 and 79 for power purposes.

Upon energization of solenoid valve 86, air under pressure is supplied therethrough to a line 88 to operate weld cylinders 68. At such time the opposite ends of cylinders 68 are connected to atmosphere by a line 89 through valve 86.

The left hand cylinder 68 seen in FIG. 1 has its piston rod 71 integral with an actuating rod 91. A switch actuator 92 is carried on rod 91 and is adapted to engage selectively switch arms 93 and 94, of respective switches 96 and 97. Switch 96 is normally held open by actuator 92 contacting arm 93 thereof, and closes when actuator 92 moves to the right.

A circuit is then made through switch 96 consisting of power lead 83, lead 98 branching therefrom, switch 96, a lead 99 connected to a three-way solenoid operated valve 101, and lead 102 connected to lead 87. When valve 101 is thus energized, air is supplied through valve 102 and to an air line 103 connected to feed cylinder 37. A throttling valve 105 is interposed in line 103 to regulate the flow of the pressure air to feed cylinder 37 and the speed at which cylinder 37 operates. When cylinder 37 is thus supplied with air, the piston rod 41 moves to advance feed shuttle 31 connected thereto, in turn to advance a capacitor C to the welding position at weld station 18 as previously described.

The actuation of switch 82, which need be momentary only, causes the four-way valve 86 to move to the position to operate weld cylinders 68 in the manner described. The valve 86 remains in the position described until it is operated in the reverse direction.

The movement of actuator 92 mounted on rod 91 causes it to engage switch arm 94 to close switch 97. When the latter is closed, a circuit is made by way of leads 118 and 119 and the power leads 77 and 78 to start the timing sequence of timer 104.

The initiation of the timing sequence through timer 104, as described, causes energy to be supplied to jaws 54. The timer 104 is accordingly connected to leads 107 and 108 having a coil 109 connected thereacross. When coil 109 is energized, contacts 111 and 112 associated therewith supply power from leads 77 and 79 to a primary winding 113 of a power transformer 116. A secondary winding 117 thereof is connected across the power leads 66 and 67 in turn connected to the resistance elements of the jaws 54.

During the interval the jaws 54 together with the pigtails PT are in contact with the ends of the capacitor C, the spiral end 27 of pigtail will be greatly heated. Both heat and pressure is applied to the ends of the capacitor C by reason of the bias in springs 73, this bias always being kept substantially uniform during the welding cycle.

When the timer 104 reaches the end of its cycle, the four-way solenoid valve 86 is operated in the opposite direction by a lead 106 from timer 104 connected in a circuit with the control power leads 77 and 78 through timer 104. At this time, air will be directed to the opposite ends of cylinders 68 to retract the jaws 54.

It may be noted that the return of the cylinders 68 to their start position seen in FIG. 1 will open switch 96. The circuit to solenoid operated three-way valve 101 is thereupon deenergized, and the spring 42 in feed cylinder 37 returns feed shuttle 31 to the start position seen in FIG. 9.

At such time capacitor C, with the pigtails PT welded thereto, is no longer supported by the feed shuttle 31, nor by the jaws 54. It thereupon drops through an opening 119 in base 16, see FIG. 9.

From the foregoing it is believed evident that some and useful improvements have been disclosed in the art of affixing wiring connections or pigtails to a condenser or the like. The structure described has been with reference to the welding of the pigtails to the condenser foil, but in certain cases where the foil and the spiral end of the pigtail are compatible by soldering such may be done. It has been found that such a highly localized heat condition can be attained on the spiral of the pigtail so that it can be securely welded even where the foil is oxide covered aluminum foil, all without the necessity of special welding fluxes, presoldering the ends, or the like. By the structure according to the invention it is possible to provide good welding pressures which are nicely controlled, as are also the structures for feeding and holding the work piece during the welding cycle.

Having thus described this invention in such full, clear, concise and exact terms as to enable any person skilled in the art to which it pertains to make and use the same, and having set forth the best mode contemplated of carrying out this invention, the subject matter regarded as being patentable is particularly pointed out and distinctly claimed in what is claimed, it being understood that equivalents or modifications of, or substitutions for, parts of the above specifically described embodiment may be made without departing from the scope of the invention as set forth in what is claimed.

I claim:

1. In a machine of the class described for welding pigtails to a wound foil capacitor or the like, a feed station comprising means for feeding said capacitors in end to end relationship, a feed shuttle having a capacitor engaging jaw thereon adapted to engage the first of said capacitors and move the same to a welding station, a pair of pigtail supporting jaws each adapted to move with a pigtail against a corresponding end of said capacitor, means for moving each of said jaws against the corresponding end of said capacitor, said fluid power means being connected to said jaw by a spring biased lost motion connection to maintain the pressure of said pigtail against said capacitor substantially uniform.

2. The invention of claim 1 wherein said jaw has heat supplying means therein, and wherein said jaw has means for supporting the shank of said pigtail, and wherein the heating effect of said heating means is localized at said supporting means.

3. In a machine of the class described for welding pigtails to a wound foil capacitor or the like, a feed station comprising means for feeding said capacitors in end to end relationship, a feed shuttle having a capacitor engaging jaw thereon adapted to engage the first of said capacitors and move the same to a welding station, said welding station comprising a resiliently biased plunger adapted to engage the capacitor being fed by said feed shuttle, a pair of pigtail supporting jaws each adapted to move with a pigtail against a corresponding end of said capacitor, and means for moving each of said jaws against the corresponding end of said capacitor.

4. In a machine of the class described for welding pigtails to a wound foil capacitor or the like, a feed station including a stage having means thereon for feeding capacitors in end to end relationship, a feed shuttle adapted to move across said stage and having a capacitor engaging jaw thereon adapted to engage the first of said capacitors and move same to a welding station, means for adjusting the position in a vertical plane of said stage according to the diameter of said capacitors, a pair of pigtail supporting jaws each adapted to move with a pigtail against a corresponding end of said capacitor, means for moving each of said jaws against a corresponding end of said capacitor, and a resiliently biased stop finger engageable with said capacitor at the end of the feed movement of said feed shuttle.

5. The invention of claim 4 wherein structure is provided for the adjustment vertically of said stop finger in accordance with the diameter of a capacitor.

References Cited

UNITED STATES PATENTS

| | | | |
|---|---|---|---|
| 2,942,093 | 6/1960 | Kuba et al. | 219—79 |
| 3,137,929 | 6/1964 | Lyon et al. | 29—203 |
| 3,200,471 | 8/1965 | Johnson et al. | 219—79 X |
| 3,294,950 | 12/1966 | Hagner et al. | 219—85 |
| 3,337,710 | 8/1967 | Stebbins | 219—85 |

RICHARD M. WOOD, *Primary Examiner.*

B. A. STEIN, *Assistant Examiner.*

U.S. Cl. X.R.

29—25.41, 203; 219—107